United States Patent [19]

Weldon

[11] Patent Number: 4,816,709

[45] Date of Patent: Mar. 28, 1989

[54] ENERGY DENSITY HOMOPOLAR GENERATOR

[76] Inventor: William F. Weldon, 4707 Peach Pipe Path, Austin, Tex. 78746

[21] Appl. No.: 67,410

[22] Filed: Jun. 24, 1987

Related U.S. Application Data

[63] Continuation of Ser. No. 689,868, Jan. 9, 1985, abandoned.

[51] Int. Cl.[4] ............................................. H02K 31/02
[52] U.S. Cl. .................................... 310/178; 310/219; 310/74
[58] Field of Search .................. 310/74, 177, 178, 219

[56] References Cited

U.S. PATENT DOCUMENTS

| | | | |
|---|---|---|---|
| 3,185,873 | 5/1965 | Rosenfeld | 310/74 X |
| 3,229,133 | 1/1966 | Sears | 310/178 |
| 3,270,228 | 8/1966 | Rioux | 310/178 |
| 3,513,340 | 5/1970 | Appleton | 310/178 |
| 3,648,088 | 3/1972 | Wilkin et al. | 310/172 |
| 3,683,216 | 8/1972 | Post | 310/74 X |
| 3,737,694 | 6/1973 | Rubenhorst | 310/74 |
| 3,944,865 | 3/1976 | Jewitt | 310/178 |
| 4,032,807 | 6/1977 | Richter | 310/178 |
| 4,086,506 | 4/1978 | Kustom et al. | 310/178 |
| 4,150,582 | 4/1979 | Brobeck | 310/74 X |
| 4,503,349 | 3/1985 | Miller | 310/178 |

FOREIGN PATENT DOCUMENTS 656584 5/1929 France .
1501087 2/1978 United Kingdom .

OTHER PUBLICATIONS

Revue Generale de l'Electricite, vol. 86, No. 3, Mar. 1977, Paris (FR) R. Brimaud et al., entitled "L'extrapolation a haute energie des machines homopolaires sans fer".

Revue Generale de l'Electricite, No. 12, Dec. 1982, Paris, (FR) C. Poubeau, entitled, "Les accumulateurs cinetiques d'energie applications au vehicule electrique", pp. 486-485.

*Primary Examiner*—Peter S. Wong
*Assistant Examiner*—Judson H. Jones
*Attorney, Agent, or Firm*—Arnold, White & Durkee

[57] ABSTRACT

An improved energy density homopolar generator is disclosed. The generator includes a stator assembly for generating a magnetic field within an interior region and a rotor responsive to the input drive and the magnetic field for generating the output generator voltage. The rotor includes a current generator means that responds to the rotation of the rotor in the magnetic field to collect the current and voltage to output terminals. An energy storage means is also provided with the rotating rotor for storing kinetic energy where the energy storage capacity of a storage means is determined independently of collection of the current and voltage by the current generator means.

6 Claims, 2 Drawing Sheets

ENERGY DENSITY HOMOPOLAR GENERATOR

This is a continuation of co-pending application Ser. No. 689,868 filed on Jan. 9, 1985, now abandoned.

BACKGROUND OF THE INVENTION

This invention relates to electrical generators. More particularly, the present invention relates to an improved energy density homopolar generator in which inertial energy is stored over a long period of time for delivery to a load in a short period of time.

Homopolar generators (HPGs) are well known and described in the literature. For example, the article entitled "The Design, Fabrication, and Testing of a Five Megajoule Homopolar Motor-Generator", authored by W. F. Weldon, et al., and presented at the International Conference on Energy Storage, Compression and Switching in Torino, Italy in November of 1974, presents an overview of HPGs in general. The article "Compact Homopolar Generator", authored by J. H. Gully, which appeared in the IEEE Transactions on Magnetics, Volume MAG-18, No. 1, January, 1982, discloses an improvement in the design of a HPG.

These and other recent design changes in homopolar generators have resulted in a substantial improvement in the HPG energy density which could be achieved over typical prior art existing designs. HPG's are now being considered as power supplies for electromagnetic launchers and other applications in the field rather than in the laboratory. Consequently, energy density has now become important. One such improved design is known as the All Iron Rotating (A-I-R) homopolar generator, and represents a design approach which eliminates, as far as possible, the non-rotating parts of the generator, concentrating the mass of the generator in the energy storing parts (rotor(s)). The rotor of the A-I-R HPG weighs typically about 1,600 pounds out of a total generator weight of 3,400 pounds, or about 47% of the total mass. Such a machine stores about 4 kilojoules (KJ) of energy per kilogram (kg) of machine mass. This may be compared to the rotor of a typical prior art homopolar generator which occupies approximately 10% of the generator mass. Such a typical prior art HPG has a total energy capacity of approximately 5 MJ (megajoules) for a specific energy density of less than one Kj/kg than one (kilojoules per kilogram).

Since the A-I-R homopolar generator approach now uses almost half of its weight to store energy it will never be able to improve its specific energy density by more than a factor of approximately two by following the design approach of minimizing the stator mass. Once the generator mass is reduced near the rotor mass, the only apparent method for increasing energy density is to increase the rotational speed of the rotor. As in any generator, the rotational speed of the rotor is controlled by an external input drive force, such as that provided by a connected hydraulic or electric motor.

While it may be possible to theoretically increase the specific energy density of the generator by increasing the rotational speed of the motor, such a design approach presents design limitations caused by the wear rate of the electrical brushes used as current collectors on the rotor surface. These electrical brushes are typically constructed of a sintered copper-graphite composite, and are poor thermal conductors making it difficult to remove the frictional heat created at the brush-to-slip ring interface.

This surface heating of the electrical brushes is a result of two phenomena, coulomb frictional heating and heating due to the brush-to-slip ring interface voltage drop. As the surface temperature of the brush reaches the melting temperature of the binders in the copper-graphite sinter, substantial wear occurs. Because of the physical phenomena occurring at the interface between the brushes and the slip ring surface, it has been found for a typical HPG application that rotor surface velocities cannot exceed approximately 220 meters per second. Although the technology is attempting to discover exotic brush materials which are more amenable to the removal of this surface heating, it is anticipated that brush wear will continue to limit HPG rotor speeds.

Since it is desirable to continue to increase the specific energy density of homopolar generators, and since brush wear prevents increasing rotor speed (the most promising route to increase energy density), it would be attractive to decouple the brush/slip ring speed from the allowable rotor tip speed.

Another way to improve the effective overall energy density of an HPG powered system is to reduce the size of auxiliary components or combine them with other components. The concept of a self excited HPG achieves this by using the generator output current to provide field excitation for the HPG itself. Energy stored inertially in the rotor is converted to energy stored magnetically in the field coil. In some cases the ferromagnetic rotor and stator material can be eliminated allowing the magnetic field to rise faster and to higher levels than can be achieved in ferromagnetic machines. This in turn allows the machine to develop higher output voltage and therefore higher power density as well. Of course, the elimination of ferromagnetic material can also reduce the weight of the machine, also improving the energy density.

The arrangement described above is particularly attractive if the HPG is to be used to charge an intermediate inductive energy store such as is such to power an electromagnetic railgun. In this case the HPG field coil can serve as the inductive store so that the total energy stored inertially in the rotor is transferred to energy stored inductively in the field coil and then transferred to the load. Not only does this eliminate the need for a separate excitation supply, but it eliminates a separate intermediate storage inductor as well. Such a machine is described in U.S. Pat. No. 4,503,349 by Miller.

A problem with self excited, air core HPG's such as that described in the Miller patent is the balance of energy required in the field coil for excitation versus the energy originally stored in the rotor. In order to take advantage of the higher magnetic flux density (and therefore higher HPG power density) that can be achieved in the air core (nonferromagnetic) excitation coil, the energy required typically exceeds the energy that can be stored in rotor(s) fitting inside the coil and operating at conventional (about 200 m/s) surface speeds dictated by present day brush technology. This usually forces the rotors to be operated at higher than standard surface speeds in order to increase rotor energy density to the point needed to excite the field coil(s). This in turn compromises the durability of the HPG by causing the brushes to operate well above their capabilities.

SUMMARY OF THE INVENTION

The present invention addresses the limitations on HPG energy density described above by separating the inertial energy storage function from the voltage generating function so that the flywheel tip speed is decoupled from the brush speed limitation. Furthermore, by removing the inertial energy storage elements from the bore of the air core self-excited field coil, the energy storage of the rotor can be increased without increasing the size and therefore energy requirements of the excitation coil.

In accordance with the prevent invention, an improved energy density homopolar generator is disclosed. The homopolar generator responds to a rotational drive input for generating a voltage and a current at a pair of output terminals. The generator includes a stator assembly for generating a magnetic field within an interior region. A rotor responds to the drive input and to the magnetic field generated by the stator assembly to generate the voltage and current.

The rotor includes a current generator means which responds to the rotation of the rotor in the magnetic field for collecting the voltage and current to the output terminals. A separate energy storage means responds to the rotational speed of the rotor for storing inertial energy where the energy storage capacity of the storage means is determined independently of collection of the voltage and current by the current generator means.

The current generator means comprises a conductive cylindrical or squirrel-cage armature which is positioned within the stator assembly fo rotation therein. The armature has disposed on its outer surface a pair of slip rings for collecting the voltage and current in response to rotation of the armature in the magnetic field. Two sets of conductive brushes coupled to the output conductors, with each brush set associated with and contacting one of the slip rings, is provided. The brushes conduct the collected current to the exitation coil. The radius of the armature brush-to-slip ring determines the surface velocity at the interface of each brush.

The energy storage means of the rotor comprises a pair of energy storage wheels, one disposed at each end of the rotor armature for rotation therewith. The radius of the wheels is independently selectable from the radius of the armature thereby permitting optimization of the energy storage capacity of the generator independently of the surface velocity of the armature at the brush-to-slip ring interface.

Furthermore, since the energy storage means of the rotor must no longer be ferromagnetic and must no longer conduct electrical current as in conventional HPG's, it can now be constructed of suitable materials to optimize its energy storage function such as graphite filament reinforce epoxy composites.

The stator assembly of the homopolar generator of the present invention includes a pair of coils encircling the current generator means portion of the rotor, with each coil associated with one associated brush and slip ring pair. Responsive to an excitation current within the stator coils, the magnetic field is generated within the interior region. A bearing assembly is mounted to the stator assembly for supportably receiving the armature therein.

In accordance with one aspect of the invention, the stator coils are operated at cryogenic superconducting temperatures in order to reduce their resistance so that the coils may generate the required magnetic field strength to provide the necessary power conversion from the generator. In a different aspect of the invention, the current collected by each brush is conducted through its associated stator coil to its associated output terminal thereby to obtain a self-excited homopolar generator. In yet another aspect of the invention, the stator coils are excited in opposite directions.

BRIEF DESCRIPTION OF THE DRAWINGS

For a fuller understanding of the present invention, reference should be had to the following detailed description taken in connection with the accompanying drawings in which.

Similar reference numerals refer to similar parts through the drawings.

DETAILED DESCRIPTION OF THE PREFERRED EMBODIMENT

Figure 1:
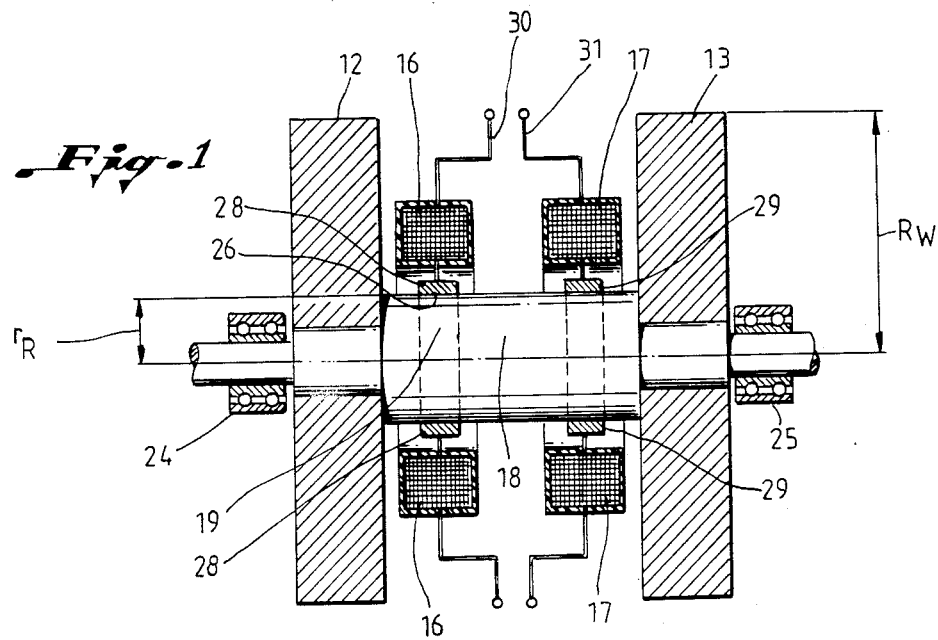
FIG. 1 is a cross-sectional view of one embodiment of the improved energy density homopolar generator constructed in accordance with the present invention in which self-excited air gap stator coils are used to generate the magnetic field in the rotor assembly.

Turning now to the figures and first to FIG. 1, there is shown in cross-section a homopolar generator constructed in accordance with the principles of the preferred embodiment of the present invention. The generator is basically constructed of two elements, a stator assembly comprised principally of the stator coils 16,17, and a rotor assembly comprised principally of a rotating shaft 18 and a pair of energy storage wheels 12 and 13 supported on bearings 24 and 25.

In a homopolar generator, there are two principal functions performed. First there is the energy storage function. Inertial energy is stored over a relatively long time period by steadily increasing the rotational speed of a large rotating mass. In the typical prior art homopolar generator, this mass is the mass of the rotor assembly which will rotate in the magnetic field developed when excitation current is applied to the stator field coils. Eventually, the rotor reaches the desired operating speed where its rotational inertia represents a quantity of stored energy which can be delivered to a load as a voltage and current by a current generator means—the second principle function performed by the generator.

The current collection function of a homopolar generator is provided by a set of electrical brushes which, at the time of unloading of the stored energy, are lowered into contact with slip ring surfaces which are a part of the conductive elements of the rotating rotor mass. At the point of contact 26 between the brushes and slip ring surfaces, there is substantial heating and wear. As pointed out above, these phenomena are directly related to the surface velocity of the rotor at the brush-to-slip ring interface. This velocity is, in turn, directly related to the radius $r_R$ of the rotor at the interface 26. Because brush wear limits surface speeds of the rotor, prior art homopolar generators have been unable to substantially increase their specific energy density and maintain any acceptable size.

In accordance with the present invention, the energy storage function of the shaft 18 rotor shaft 18 rotating within the stator coils has been partitioned from the voltage and current generation function. Disposed at opposite ends of the rotating shaft 18 of the rotor are two energy storage wheels 12,13 which are attached to the shaft 18 for rotation therewith. The radius of the energy storage wheels 12,13, $r_w$, is controlled independently of the radius, $r_R$, of the shaft 18. The energy wheels 12,13 rotate at the same speed as the rotor shaft 18, and since $r_w$ is controlled independently of $r_R$, the amount of energy stored within the generator is independent of the surface speed of slip ring surfaces at the brush-to-slip ring interface 26.

This partitioning of the energy storage function in accordance with the invention has removed essentially all of the mass of the rotor from rotation within the magnetic field of the stator coils 16,17. (While there will always be some rotating mass of the rotor in the magnetic field of the stator coils, the inertial storage provided by such mass is negligable in comparison to the energy storage provided by the wheels 12,13, less than 1% of the total energy storage.) This has reduced the flux cutting area of the rotor, and accordingly, has reduced the ability of the rotor to produce an acceptable voltage and current at the output terminals for a typical excitation current to the stator field coils. Because present designs are operating at the limits of ferro-magnetic circuit performance, simply increasing the field excitation current would not achieve the desired power output from the generator which the potential energy density would suggest was possible.

In the case of the present invention, this problem is even more acute because of the reduced conductive material of the rotor 18 cutting the flux lines of the magnetic field created by the stator coils. Accordingly, to enable the generator constructed in accordance with the invention to convert the stored inertial energy into a deliverable power at the output terminals, the magnetic field created by the stator coils 16,17 must be increased over those in prior designs.

Figure 2:
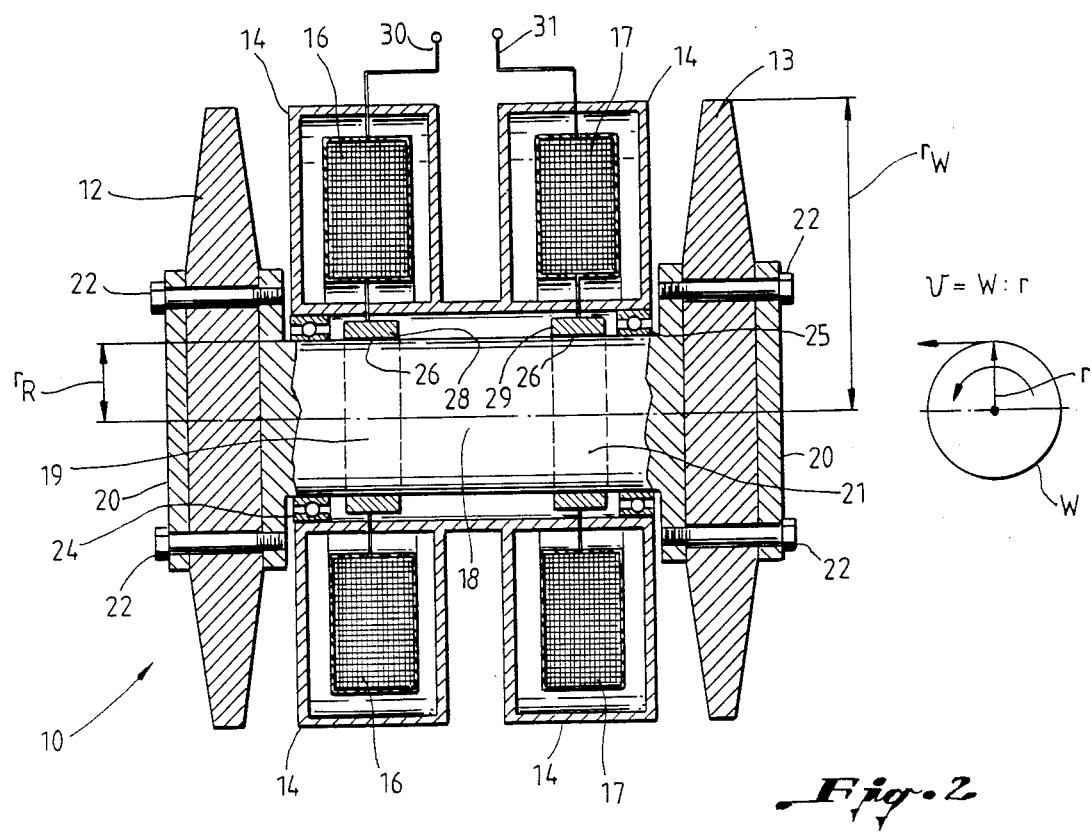
FIG. 2 is a cross-sectional view of an alternate embodiment of a homopolar generator constructed in accordance with the present invention in which the stator field coils are operated at cryogenic temperatures to obtain superconducting coils.

To achieve the necessary magnetic field strength increase to permit the required energy conversion operation at the discharge time, the present invention offers two alternative designs, a self-excited air core homopolar generator (see FIGS. 1 and 3) and a super cooled superconducting coil arrangement (FIG. 2). Yet a further arrangement could be a combination of both superconducting coils and self-excited coils (not shown). In such an arrangement, the superconducting coils would provide the initial flux in the rotor 18, but would be isolated from the transient magnetic field of the self-excited air core coil by the use of a superconducting magnetic shield.

Still referring to FIG. 1 which illustrates the preferred embodiment of the invention, a self-excited air core homopolar design, the brushes 28,29 are each shown contacting associated slip ring surfaces 19,21 on the rotor shaft 18. In the self-excited arrangement, each brush 28,29 conducts collected current to an associated output terminal 30,31 through an associated stator field coil 16,17, respectively. In this manner, there is "self-excitation" of the stator coils.

Self-excited, air core HPG's have always, in principle, offered an attractive alternative to more conventional iron core HPG since they essentially achieve their excitation "for free", and avoid the two tesla (2.0 T) saturation limit of ferro-magnetic materials while at the same time eliminating the weight of iron based materials. However, these features are not the primary reason for selecting a self-excited air core coil arrangement. The primary advantage of the self-excited air core HPG is its ability to operate at magnetic flux densities substantially above the saturation limit of ferromagnetic materials. A related advantage is the fact that the linear magnetic behavior of non-ferro-magnetic materials eliminates the phenomenon of armature reaction which affects iron core HPG's at high output currents ($>1$ MA).

For air core HPG's, the field excitation requirements increase by a factor of approximately 1000 due to the difference in relative permeabilities of iron and air. This puts a severe constraint on the performance of certain self-excited air core HPG components. This is most easily seen by comparing the volumetric energy density of the air core field coil with that of the HPG rotor(s).

The energy density in the core of the air core storage inductor/field coil can be expressed as $$\frac{E_{bore}}{V_{bore}} = \frac{B^2}{2\mu_o}$$

where, $E_{bore}$ = Magnetic Energy in Bore of Coil $V_{bore}$ = Volume Enclosed in Bore of Coil = $R_{bore}^2 L_{bore}$ $B$ = Root Mean Square Magnetic Flux Density in Coil Bore $\mu_o$ = Permeability of Free Space = $4\pi \times 10^{-7}$ For solenoidial coils with length-to-diameter ratios around 0.5, the total inductive energy $E_{IND}$ is about twice that in the coil bore. Thus, $$\frac{E_{IND}}{V_{bore}} = \frac{B^2}{\mu_o}$$

If the rotor(s) are 0.9 of the coil bore in diameter and 0.9 of the coil length, a similar relationship results for the inertial energy density in the rotors $$E_{INER} = \tfrac{1}{2}J\omega^2 = \frac{r_r^4 L_r S \omega^2}{4},$$

where $E_{INER}$ = inertial energy stores in rotor(s)
$J$ = rotor moment of inertia
$\omega$ = rotor angular velocity
$r_r$ = rotor radius = 0.9 $R_{bore}$
$L_r$ = total rotor length = 0.9 bore
$S$ = density of rotor material.

Substituting for $r_r$ and $L_r$, and recalling that $r_r \omega = V$, $$\frac{E_{INER}}{V_{bore}} = 0.182\,\sigma\,v^2$$

Assuming a 50% energy transfer efficiency from the inertial store to the inductive store, the following relationship between the inertial magnetic energy densities obtains, $$(0.50)\frac{E_{INER}}{V_{bore}} = \frac{E_{IND}}{V_{bore}}$$

Substituting and solving for B gives a relationship between rotor tip speed and the maximum achievable core coil flux density B, $$B = (0.091\mu_o\delta v^2)^{\frac{1}{2}}$$

Since the flux in a self-excited air core HPG ranges from essentially zero to some peak value while in a comparable iron core HPG it remains constant, the self-excited air core HPG must achieve a peak flux density of approximately twice that of the iron core machine in order to achieve comparable performance, i.e., approximately 4 T. In order to realize the primary advantage of the self-excited air core HPG, that is, the ability to operate at higher flux densities than iron core machines, such machines should operate at peak flux densities substantially higher than 4 T.

The improved energy density concept of the present invention is the separation of the energy storage and voltage generation functions. Since the present day brush speed capability limits rotor energy density, separation of functions allows the energy storage rotor(s) to operate at peak tip speeds for maximum energy density while the electrical generating section of the generator operates at surface speeds dictated by the brushes.

Still referring to FIG. 1, this innovation allows design freedom in several directions. Since the energy storage flywheels 12,13 no longer must serve as electrical conductors they can be fabricated of fiber-reinforced epoxy resin composites which are capable of storing energy at much higher energy densities than metals. Graphite fiber-reinforced epoxy of flywheels, operating consistently on a production basis at 1200 m/s achieve energy densities more than twelve times greater than aluminum flywheels.

Figure 3:
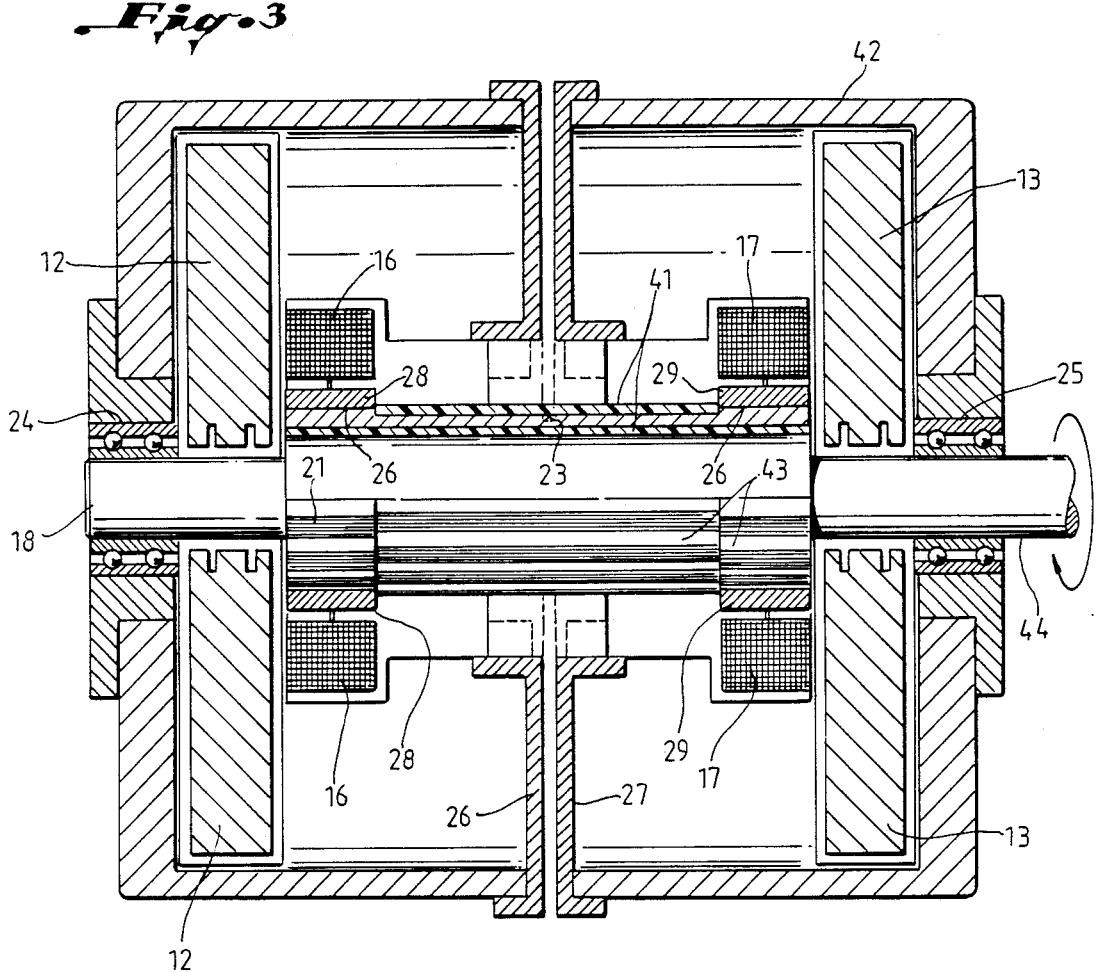
FIG. 3 is a more detailed cross-sectional view of a homopolar generator constructed in accordance with the principles as illustrated in FIG. 1 in which the rotor assembly includes a squirrel cage armature for the generator's current generator means.

Turning now to FIG. 2 where the superconducting HPG embodiment is shown, to provide the superconducting cryogenic temperatures for the field coils 16,17, each coil is contained within a structural Dewar container with appropriate cryogenic temperatures therein to achieve the superconducting operating conditions for the coils. To provide support to the rotating shaft, a pair of bearings 24 are disposed to opposite ends of the rotating shaft 18 to provide rotational support for the shaft within the magnetic field of the stator assembly. (Each embodiment shown in the figures contains some sort of bearing means for supportably receiving the rotor for rotation in the stator field.) The rotating shaft 18 is constructed of a high strength, high conductivity material and functions as a single turn stator coil between the slip ring surfaces 19. An alternate embodiment of the HPG shown in FIG. 2 would be to use the squirrel-cage armature design, as shown in FIG. 3, in place of the solid shaft 18 as shown in FIG. 2.

Furthermore, the separation of energy storage and electrical generation function means that as improvements are made in either area they can be incorporated into the HPG without being limited by the other function. That is, brush speed and rotor tip speed are permanently decoupled in the present invention and may be adjusted relative to each other as future capability dictates merely by adjusting the relative diameters of the energy storage and electrical generator rotors.

The following Table 1 illustrates a comparison of the maximum possible surface speeds and the resulting energy densities that can be obtained for the energy storage wheels 12,13 made of different materials.

TABLE 1

| Material | Maximum Surface Velocity (m/s) | Energy Density (kJ/kg) |
|---|---|---|
| Flat Steel Disk | 550 | 15 |
| Shaped Steel Disk | 670 | 21 |
| Fiberglass/Epoxy Disk | 760 | 41 |
| Kevlar/Epoxy Disk | 960 | 65 |

In accordance with the present invention, if a 36 inch diameter, 12 inch thick Kevlar/Epoxy flywheel is divided into two 6-inch thick energy storage wheels and operated at 20,000 rpm, a homopolar generator can be constructed of approximately the same size as a typical prior art A-I-R HPG, but storing 90 MJ rather than the maximum obtainable 6.2 MJ for the A-I-R design.

The highest acceptable prior art HPG machine capacitance has been determined to be around 5,000 F (farads), although higher values are acceptable for a homopolar generator constructed in accordance with the principals of the present invention. Assuming, however, a machine capacitance of 5,000 F, the voltage of the generator V would equal 190 Volts as determined from the following calculation:

$$V = ((2\times E)/C)^{\frac{1}{2}} = ((2\times 90\times 10^6)/5,000)^{\frac{1}{2}} = 190\text{ V}$$

Since $$V = \phi\omega/2\pi$$

or $$\phi = 2\pi V/\omega = 0.57 Wb \text{ (webers)},$$

to produce a field strength of 0.57 Wb, an average magnetic field strength in the rotating shaft 18 of 12.7 T is required. Increasing the machine capacity to 10,000 F, which is acceptable in the case of the present invention, reduces the required field strength to 9 T.

In the case of superconducting coils 16,17, to produce a magnetic field density of 9 T would require a coil weighing approximately 1,100 pounds. This means that the generator in accordance with the present invention would weight less than 2,000 pounds and achieve a specific energy density of approximately 100 kJ/kg, a value which is substantially greater than the specific energy density of 6.2 kJ/kg which is theoretically possible in accordance with the principles of the prior art A-I-R HPG designs.

Turning now to FIG. 3, there is illustrated a self-excited air core homopolar generator similar to that shown in FIG. 1. The HPG shown in FIG. 3 illustrates yet a further feature of the present invention. One of the problem in self excited HPGs is the flux trapped in the rotor's conductive material during discharge of the inductive store which results in inefficient energy conversion. Because of the division between the energy store and current collection functions in the present invention, a squirrel-cage armature construction is possible for the rotor shaft 18, as opposed to a solid shaft. Since a squirrel-cage armature can be made highly conductive in the axial direction and highly resistive in the circumferential direction, the armature bars 23 from which the armature is constructed can be close to the field coil for maximum voltage generation and yet not act as a flux trapping shorted turn when the inductor is discharged.

The field coils 16,17 are wound in opposite directions so they produce opposite magnetic fields in the armature. Although the opposing (counterwound) field coil pair 16,17 may not appear to be optimal from an energy storage aspect, such an arrangement provides the highest ratio of useful flux density (flux cut by rotor armature) to peak flux density (limited by strength of inductor structure). Decoupling the inertial energy in the flywheels from the inductor (by placing the storage wheels outside the stator field) allows several operational modes which were not possible with prior art HPGs. In a typical self-excited air core HPG, the rotor(s) is brought up to speed, some initial source of excitation flux is provided (usually to 10% of peak flux) and the inertial energy in the rotor(s) is transferred to inductive energy in the series connected field coil, the field coil flux rising with the generator current. When the current in the field coil peaks, a switch is opened in the circuit transferring the energy stored in the inductor into the load.

However, if the flywheel energy is increased substantially over that required to excite the field coil(s) (which can be accomplished simply by making the flywheels thicker in the axial direction), a different operating mode is possible. The discharge proceeds in the classical manner until peak current is reached in the field coil. Since substantial inertial energy will remain in the rotor at this point, the field coil can be crowbarred (short circuited) and energy extracted from the rotor as a high voltage HPG. Field coil current will decay with the L/R time of the inductor, but this time can be made long compared to the discharge time of the HPG. One extremely attractive aspect of this operating mode is that it does not require an opening switch capable of interrupting the current in the inductor.

Other operating modes include (1) operation as a self-excited continuous duty generator driven by a high power turbine, (2) replacing the self-excited field coil with a superconducting coil set (see FIG. 2), or (3) using a superconducting coil to supplement the self-excited coil to provide the initial flux.

Still referring to FIG. 3, the self-excited air core HPG uses two 1.0 m diameter, 0.2 m thick graphite fiber-reinforced epoxy flywheels operating at 1200 m/s (23,000 rpm) and storing 113 MJ each.

The squirrel-cage HPG armature 18 is 0.25 m in diameter with an active length of 0.45 m. With an average flux density at the armature of 6.7 T the generator will develop 450 volts at half speed.

Figure 4:
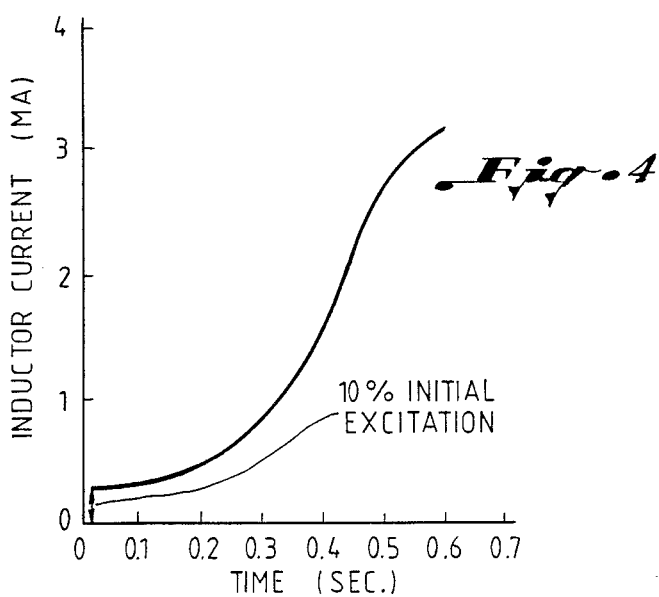
FIG. 4 is a graphical presentation of the expected performance of the homopolar generator illustrated in FIG. 3.

The field coil consists of two multiconductor 4 turn liquid nitrogen (LN2) cooled aluminum inductors 16, 17 reinforced either with a fiberglass or Kevlar overwrap or with internal boron filaments. They will operate at a peak flux density of approximately 20 T at a current of 3.2 MA (see FIG. 4). The coils will be insulated for 10,000 V working volts.

The ends of the squirrel-cage armature conductors 23 will be joined circumferentially by highly resistive metal spacers 43 to provide a continuous slip-ring surface for actively cooled copper finger brushes 28,29 operating at 300 M/S and a slip-ring current density of 20,000 a/in$^2$. The resistive spacers 43 prevent the armature conductors 23 from trapping field coil flux during the inductor discharge. The armature bars 23 are insulated from the material of the rotor shaft 18 by fiberglass epoxy-wrapped pieces 41. Accordingly, only the conductive bars 23 conduct current as a result of rotation of the bars through the magnetic field of the stator coils 16, 17.

The HPG is enclosed in a fiberglass reinforced epoxy structure 42 which is 1.1 m × 1.1 m × 1.5 m long. This enclosure will provide structural support, act as a vacuum vessel (necessary for high speed rotors), a cryostat for the LN$^2$ coil coolant, and will house the auxiliary components necessary for machine operation. The weight of the HPG shown in FIG. 3 is 2500 kg. Operating parameters of the HPG shown in FIG. 3 are summarized in the following Table 2, and the discharge performance is plotted in FIG. 4.

TABLE 2

| | | |
|---|---|---|
| Overall Volume | 1.8 m$^3$ | |
| Overall Weight | 2500 kg | |
| Inertial Energy Storage | 230 MJ | (92 kJ/kg) |
| Inductive Energy Storage | 136 MJ | (54 kJ/kg) |
| Peak Current | 3.2 MA | |
| Peak HPG Voltage | 450 V | |
| Peak Inductor Voltage | 10000 V | |
| Peak HPG Power | 1.4 GW | (560 kW/kg) |
| Peak Output Power | 32 GW | (13 MW/kg) |

While a particular embodiment of the present invention has been shown and described, it will be understood that the invention is not limited thereto, since many modifications may be made and will become apparent to those skilled in the art. For example, rather than using self-excited stator coils, the coils could be excited from an external source, with the current from the brushes conducted directly to the output terminals.

What is claimed is:

1. An air-core self-excited homopolar generator responsive to a rotational drive input for generating a current at a load, comprising:
   (a) a field coil assembly for generating a magnetic field within an interior region and for storing a collected current for said load, said collected current contributing to said generated magnetic field;
   (b) a rotor positioned in said interior region and responsive to said drive input and said magnetic field for generating said current, said rotor comprising,
      (i) an armature having highly conductive circuit elements in the axial direction but highly resistive circuit elements in the circumferential direction, and
      (ii) a pair of spaced apart slip ring surfaces, each disposed circumferentially on said armature and electrically coupled to said circuit elements, said armature having a radius at each said slip ring surface which determines the rotor surface speed thereat;
   (c) a pair of conductive brush assemblies coupled to said field coil assembly, each said conductive brush assembly contacting an associated one of said slip ring surfaces, said brush assemblies having a maximum rotor surface speed at said slip ring surfaces at which said brushes can operate; and (d) an energy storage means coupled to said rotor for rotation therewith for storing inertial energy where the energy storage capacity of said storage means is obtained independently of any radius of said rotor,
  (i) said brush assemblies, said axially conductive armature circuit elements, and said slip ring surfaces cooperating together to collect a current to said field coil assembly in response to rotation of said armature in said magnetic field, and
  (ii) said circumferentially resistive armature circuit elements permitting an increase in discharge efficiency of said collected current to said load by reducing the magnetic coupling of said armature to the flux of said magentic field during discharge of the collected current in said field coil assembly to said load.

2. The generator of claim 1 wherein said energy storage means includes an energy storage wheel comprised of a composite material and having a radius greater than any radius of said rotor, said greater radius and said composite material permitting,
  (i) a surface speed of said wheel which exceeds any surface speed of said rotor rotating in said magnetic field thereby resulting in an increased energy storage with optimization of the energy storage capacity per unit weight for said generator while operating with rotor surface speeds below said maximum at which said brush assemblies can operate, and
  (ii) said composite material permitting an increase in both current collection efficiency and discharge efficiency of collected current to said load by eliminating magnetic coupling in said storage wheel of flux from said magnetic field during, respectively, collection and delivery of said collected current to said load.

3. The generator of claims 2 wherein said energy storage means of said generator comprises a pair of energy storage wheels, one disposed proximal each end of said rotor for rotation therewith, each said wheel composed of a composite material.

4. The generator of claims 1 or 2 wherein said armature comprises a plurality of electrically conductive circuit bars which run axially along the outer surface of the armature, each separated from its neighbor by an insulating layer, said end surfaces of said bars conditioned for slip ring surfaces so that when said brush assemblies are contacting said slip ring surfaces, highly conductive circuit paths between the brushes are established, but when the collected current in said field coil assembly is discharged to said load, said insulating spacers provide a highly resistive circumferential circuit path to minimize trapping of the magnetic field created by the discharging current from said field coil.

5. An air-core self-excited homopolar generator, comprising:
  a field coil assembly adapted to generate a magnetic field in a first region;
  a conductive rotor, said rotor at least partially positioned in said first region, said rotor comprising an armature, said armature comprising,
    a first set of elements extending generally longitudinally along a portion of the length of said rotor, said first set of elements being conductive to current; and
    a second set of elements extending circumferentially around said armature, said second set of elements being relatively resistive to current relative to said first set of elements, said conductive and resistive elements establishing an armature facilitating the flow of current generally longitudinally along a portion of said armature, but resisting the flow of current around said armature;
  current collection brushes for contacting said rotor at respective contact locations, said motor having diameters at each of said contact locations; and
  a flywheel coupled to said rotor, said flywheel formed at least in part of a non-metallic material, the diameter of said flywheel established independently of the diameter of said rotor at at least one of said contact locations, said flywheel substantially magnetically decoupled from said magnetic field in said first region.

6. The homopolar generator of claim 5 wherein said flywheel is formed of a composite material.

* * * * *

UNITED STATES PATENT AND TRADEMARK OFFICE
CERTIFICATE OF CORRECTION

PATENT NO. : 4,816,709
DATED : Mar. 28, 1989
INVENTOR(S) : William F. Weldon

It is certified that error appears in the above-identified patent and that said Letters Patent is hereby corrected as shown below:

Column 1, line 47 delete second instance of "than one".

Column 3, line 32 delete "fo" and insert therefor --for--.

Column 6, line 27 delete "core" and insert therefor --bore--.

Column 7, line 14 after "speed" insert --V--.

Column 9, line 62 delete "Kevalar" and insert therefor --Kevlar--.

Column 11, line 37, delete "claims" and insert therefor --claim--.

Column 12, line 33, delete "motor" and insert therefor --rotor--.

Signed and Sealed this

Second Day of January, 1990

Attest:

JEFFREY M. SAMUELS

*Attesting Officer*  *Acting Commissioner of Patents and Trademarks*